US012698108B2

(12) United States Patent
Bartling et al.

(10) Patent No.: US 12,698,108 B2
(45) Date of Patent: Aug. 4, 2026

(54) APPARATUS FOR FILLING A CONTAINER WITH BULK MATERIAL

(71) Applicant: NOWE GMBH, Elze (DE)

(72) Inventors: Werner Bartling, Elze (DE);
Alexander Reich, Meerbusch (DE);
Ralf Weiß, Banteln (DE)

(73) Assignee: NOWE GMBH, Elze (DE)

( * ) Notice: Subject to any disclaimer, the term of this patent is extended or adjusted under 35 U.S.C. 154(b) by 0 days.

(21) Appl. No.: 18/554,077

(22) PCT Filed: Apr. 14, 2022

(86) PCT No.: PCT/EP2022/059992
§ 371 (c)(1),
(2) Date: Oct. 5, 2023

(87) PCT Pub. No.: WO2022/223423
PCT Pub. Date: Oct. 27, 2022

(65) Prior Publication Data
US 2024/0367828 A1 Nov. 7, 2024

(30) Foreign Application Priority Data

Apr. 19, 2021 (AT) ................................. 50287/2021

(51) Int. Cl.
*B65B 1/30* (2006.01)
*B65B 1/16* (2006.01)
(Continued)

(52) U.S. Cl.
CPC ................. *B65B 1/30* (2013.01); *B65B 1/16* (2013.01); *B65B 1/28* (2013.01); *G01F 23/2928* (2013.01)

(58) Field of Classification Search
None
See application file for complete search history.

(56) References Cited

U.S. PATENT DOCUMENTS 3,881,610 A * 5/1975 Hessling .............. B65G 69/182
414/289
4,061,221 A * 12/1977 Higashinaka ........ B65G 69/186
141/93
(Continued)

FOREIGN PATENT DOCUMENTS

AT 522142 A4 8/2020
AT 522142 B1 8/2020
(Continued)

OTHER PUBLICATIONS

Office action for the corresponding Priority Application No. A 50287/2021 (4 pages).
(Continued)

*Primary Examiner* — Tanzim Imam
(74) *Attorney, Agent, or Firm* — K&L Gates LLP

(57) ABSTRACT

The invention relates to an apparatus for filling a container with bulk material, having a storage container for the bulk material with a closable lid and an outlet, a metering device arranged below the storage container, a pneumatic conveying device for conveying the bulk material with the aid of compressed air into the container to be filled via a conveying hose with a blow-out lance at the free end, wherein a control device for controlling the filling process is provided. In order to be able to ensure that the filling process is terminated on time, an electro-optical distance-measuring device which is connected to the control device is arranged with a light guide for measuring the filling level of the bulk material in the container during the filling process, and a suction-removal nozzle is arranged coaxially around the blow-out lance at the blow-out lance, wherein the free end of the light guide of the electro-optical distance measuring device is arranged at the region of the blow-out lance on the suction-removal nozzle.

10 Claims, 3 Drawing Sheets

(51) Int. Cl.
B65B 1/28        (2006.01)
G01F 23/292      (2006.01)

(56)                References Cited

U.S. PATENT DOCUMENTS

| | | | | |
|---|---|---|---|---|
| 4,225,033 A * | 9/1980 | Fukagai | B65G 69/186 | |
| | | | 141/93 | |
| 4,614,213 A * | 9/1986 | Englin | B65B 1/32 | |
| | | | 141/59 | |
| 4,699,187 A * | 10/1987 | Binzen | B65G 69/186 | |
| | | | 141/93 | |
| 5,154,271 A * | 10/1992 | Binzen | B65G 69/181 | |
| | | | 193/30 | |
| 5,190,132 A * | 3/1993 | Stanelle | B65G 69/182 | |
| | | | 193/25 E | |
| 5,332,012 A * | 7/1994 | Svendsen | B65G 69/182 | |
| | | | 141/93 | |
| 6,655,425 B2 * | 12/2003 | Doerffel | B65G 69/182 | |
| | | | 141/286 | |
| 8,087,851 B1 * | 1/2012 | Jarvis | B65G 53/34 | |
| | | | 406/137 | |
| 2006/0174971 A1 * | 8/2006 | Kallberg | G01F 23/292 | |
| | | | 141/198 | |
| 2009/0254231 A1 * | 10/2009 | Bartling | B60B 39/025 | |
| | | | 701/19 | |
| 2018/0194498 A1 * | 7/2018 | Michels | B65B 43/123 | |

FOREIGN PATENT DOCUMENTS

| | | | | |
|---|---|---|---|---|
| DE | 9006250 U1 | 8/1990 | | |
| DE | 20122754 U1 | 7/2007 | | |
| DE | 102017118867 A1 | 2/2019 | | |
| EP | 3789305 A1 * | 3/2021 | | B65B 69/00 |
| JP | S5262584 A | 5/1977 | | |

OTHER PUBLICATIONS

Wikipedia article "Optical fiber optic cable") Wikipedia article "Fiber optic cable" from Feb. 6, 2021 .https://de.wikipedia.org/w/index.php?title=Lichtwellenleiter.

International Search Report and Written Opinion dated Aug. 10, 2022 for corresponding International application No. PCT/EP2022/059992 (11 pages).

International Preliminary Report on Patentability dated Oct. 19, 2023 for corresponding International application No. PCT/EP2022/059992 (7 pages).

* cited by examiner

APPARATUS FOR FILLING A CONTAINER WITH BULK MATERIAL

CROSS-REFERENCE TO RELATED APPLICATIONS

This application is a national phase entry of International Patent Application No. PCT/EP2022/059992 (filed 14 Apr. 2022), which claims priority to Austrian Patent Application No. A 50287/2021 (filed 19 Apr. 2021), the entire disclosures of which are incorporated herein by reference.

BACKGROUND

Technical Field

The invention relates to an apparatus for filling a container with bulk material, in particular sand, comprising a storage container for the bulk material having a closable lid and an outlet, a metering device arranged beneath the storage container, a pneumatic conveying device for conveying the bulk material, with the aid of compressed air, into the container to be filled via a conveying hose with a blow-out lance at the free end, wherein a control device is provided for controlling the filling process.

The present invention relates mainly, but not exclusively, to an apparatus for filling a sand container, such as is used in particular in rail-bound and driven vehicles in sanding systems for supporting braking and drive technology. The containers for the bulk material, in particular the sand containers in vehicles, in particular rail vehicles, are usually filled manually or semi-automatically with the bulk material, in particular grit. Apart from the fact that the filling of the bulk material containers is very time-consuming and physically stressful, considerable dust formation often also occurs, as a result of which the health of the personnel is endangered or safety measures are required.

Discussion of Art

For example, AT 522 142 B1 describes a filling apparatus of the type described herein. Via a pressure sensor that is arranged in the conveying device and is connected to the control device, a counterpressure, which occurs when the container to be filled reaches the filling limit, can be detected. As a result, an automatic shutdown of the conveyance of the bulk material can be initiated. However, the counterpressure, which is, for example, in the region of a few millibars, does not represent a reliable possibility for automatic control of the filling process.

US 2006/174971 A1 discloses a filling apparatus for a liquid container, wherein light guides of an electro-optical distance measuring device are arranged on the nozzle gun to be able to measure the liquid level during filling.

BRIEF DESCRIPTION

The object of the present invention is therefore to provide a filling apparatus as mentioned above that enables a reliable automatic shutdown of the filling process and reduces the risk of overfilling and leakage of bulk material and dust during the filling process. Disadvantages of known filling apparatuses should be avoided or at least reduced.

The object according to the invention is solved by a filling apparatus as mentioned above in which an electro-optical distance measuring device connected to the control device and having a light guide is provided for measuring the fill level of the bulk material in the container during the filling process, and a suction-removal nozzle is arranged on the blow-out lance coaxially around the blow-out lance, wherein the free end of the light guide of the electro-optical distance measuring device is arranged on the suction-removal nozzle in the region of the blow-out lance. An electro-optical distance measuring device is used to measure a distance via the propagation time measurement of a temporally short light pulse which is emitted via a light guide, reflected at a target and received again by the same light guide. Usually, a laser pulse is used as light signal. The electro-optical distance measuring device can be arranged at any point of the filling apparatus and is connected to the light guide, the free end of which is arranged in the region of the blow-out lance. This makes it possible to measure the fill level of the bulk material in the container to be filled during the filling process. Since the blow-out lance projects into the filling opening of the container at the end of the conveying hose, the free end of the light guide, via which the light pulses for distance measurement are emitted and received again, also points into the container. This ensures a reliable detection of the filling state in the container and a deactivation of the conveyance of the bulk material on time. Compared to a measurement of the counterpressure, such an optical measurement is more accurate and safer directly in the container to be filled. According to the invention, a completion of the filling process is therefore achieved on time and an undesired escape of bulk material at the end of the filling process is avoided. By virtue of the fact that a suction-removal nozzle is arranged on the blow-out lance, any dust which may arise can be sucked off during the filling process and an escape into the atmosphere can be prevented. As a result, it is not necessary for the operating personnel to use protective devices, such as, for example, breathing masks. The suction-removal nozzle is preferably arranged to be displaceable and fixable in the longitudinal direction of the blow-out lance. As a result, an optimal positioning of the suction-removal nozzle and thus an optimal dust detection or dust suction-removal can be carried out. The suction-removal nozzle is arranged coaxially around the blow-out lance, wherein the free end of the light guide of the electro-optical distance measuring device is arranged on the suction-removal nozzle. The electro-optical distance measuring device can be realised relatively inexpensive and, moreover, it is insensitive to electromagnetic interferences. When certain filling levels have been reached, an optical or acoustic output, for example, of certain signals can take place to report the operating personnel of the filling apparatus of the current filling level. The control device for controlling the filling process is preferably formed by a microprocessor or microcontroller, which is supplied with electrical power from an appropriate voltage supply. The control device is connected to operating elements or a user interface to enable various settings.

If the light guide of the electro-optical distance measuring device is arranged in a protective hose, damage thereto can be prevented. The light guide located in the protective hose can be guided in a suitable manner from the region of the blow-out lance to the electro-optical distance measuring device, for example along or even within a cover of the conveying hose. The protective hose can be made of plastic or also metal.

Advantageously, the electro-optical distance measuring device is formed by a laser distance measuring device. Such laser distance measuring devices are relatively cheap and available in a small size.

According to a further feature of the invention, the control device is designed to deactivate the conveying of the bulk material as soon as the electro-optical distance measuring device measures a predetermined maximum fill level of the bulk material in the container. In this way, an automatic shutdown of the filling can take place without the fill level having to be displayed or output.

Advantageously, the control device is designed for delayed deactivation of the conveyance of the bulk material over a predetermined period of time. As a result, the conveying hose can be blown free from bulk material, in particular sand, and can be prevented from sand trickling out of the conveying hose, when the conveying hose is pulled out of the opening of the container to be filled and leading to dirt and dust formation. By means of such a time-controlled subsequent blowing function after completion of the filling process, which is maintained, for example, for a few seconds, the conveying hose can thus be kept free of residues of the bulk material.

If the control device is connected to a measuring device for detecting the fill level of the bulk material in the container, the filling apparatus can at most be reported via a higher-level exchange centre station if there is a need for filling.

For the purpose of a wireless connection of the filling apparatus to the measuring device, the control device can be connected to a transceiver (transmitter/receiver) for a wireless connection to the measuring device for detecting the fill level of the bulk material in the container. Thus, an exchange of data takes place between the container for the bulk material, which is arranged, for example, in a rail vehicle, and the filling apparatus. As a result, the filling apparatus or a higher-level exchange centre can be reported when filling of the container is necessary. As a result, the planning of maintenance of the rail vehicle, for example, can be supported. Subsequently, the times during which, for example, rail vehicles are not available due to the maintenance and filling of the containers with bulk material can be reduced.

If a display connected to the control device is provided for depicting the fill level of the bulk material in the container, appropriate information about the fill level can be reported to the operating personnel of the filling apparatus. A display can be designed, for example, in the form of three differently coloured light elements or in the form of a screen for depicting a numerical value. The display can also be arranged at a higher-level location, for example a maintenance exchange centre, and does not necessarily have to be mounted on the filling apparatus itself.

If a sensor for detecting the fill level of the bulk material in the storage container is provided in the storage container and is connected to the control device, a necessary refilling of the storage container can also be pointed out on time. It can also be ensured via the fill level in the storage container whether filling a container with bulk material with the existing amount of bulk material will even run out. The sensor can be implemented, for example, in the form of a capacitive sensor. Also other types of sensors, for example sensors that measure the weight of the storage container or ultrasonic sensors or optical sensors that measure the fill level without contact, are also conceivable.

Furthermore, a sensor for detecting the flow of the bulk material can be provided in the conveying device and connected to the control device. As a result, the flow of the bulk material can be monitored during the conveyance and, for example, obstructions can be automatically detected and lead to the output of an optical or acoustic message or also to the automatic shutdown of the conveyance. If no flow of bulk material is detected even after activation of the conveyance, this can also be an indication that bulk material is no longer present in the storage container or a blockage has occurred in the conveying line. During the filling process, fluctuations in the flow sensor are an indication of fluctuations or also interruptions in the conveyance of the bulk material.

The suction-removal nozzle is connected to a suction-removal and dedusting device via a suction-removal hose. In the dedusting device, the dust detected and removed is at most collected in appropriate collecting containers and can thus be disposed simply and reliably. Since dust from bulk material, in particular grit, is mostly breathable dust, this waste must be treated as hazardous material and must be disposed of appropriately.

The suction-removal and dedusting device preferably comprises a filter and a dust collection container. Components in the suction-removal and dedusting device largely prevent the dust, which may occur during filling, from escaping into the atmosphere. Depending on the bulk material used and the dust occurring, appropriate suitable filters, for example microfine filters, are used. The filter system can have an automatic filter cleaning function, which enables trouble-free operation of the suction-removal and dedusting device and thus of the entire filling apparatus.

An actuating element, preferably an on/off switch, can be arranged on the blow-out lance, which actuating element is connected to the control device. Via the actuating element, the operating personnel can thus also control the filling process at a certain distance from the filling apparatus.

Preferably, the conveying device comprises an injector with a plurality of bores for the compressed air. By means of the specially designed conveying device in the form of a so-called propelling jet injector with a plurality of bores for the compressed air for conveying the bulk material, a simple, energy-efficient, and uniform conveyance of the bulk material through the conveying hose can also be achieved over longer conveying lengths and in the case of height differences. Preferably, the injector has at least five bores, wherein preferably one bore in the injector runs centrally and the other bores are arranged circularly around the central bore. The bores arranged around the central bore can be arranged to extend conically outwards.

BRIEF DESCRIPTION OF THE DRAWINGS

The invention will be described in greater detail with reference to the accompanying drawings. Therein.

DETAILED DESCRIPTION

Figure 1:
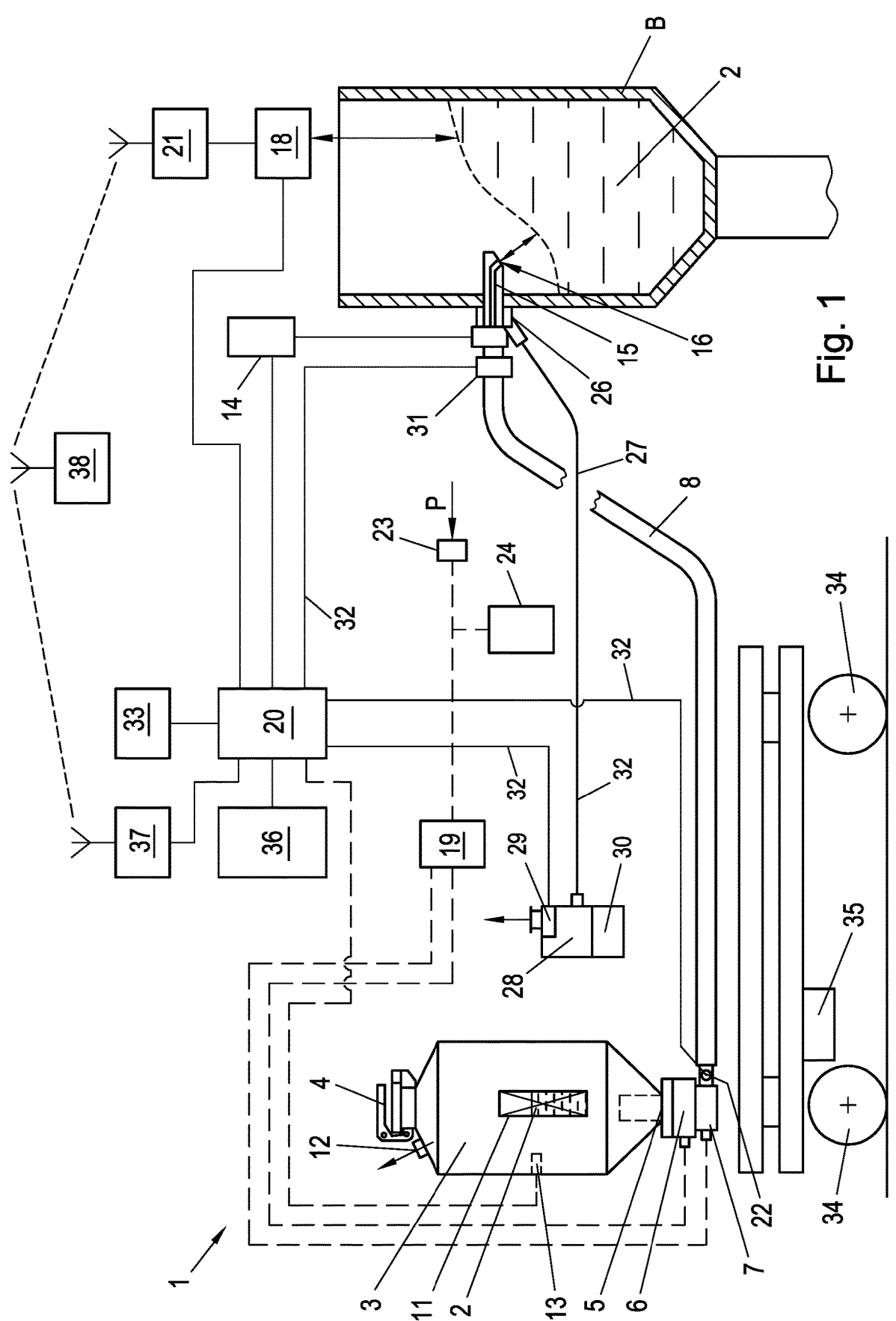
FIG. 1 shows a schematic view of a device for filling a container with bulk material with an electro-optical distance measuring device for measuring the filling level of the bulk material in the container during the filling process.

In FIG. 1, a schematic view of a device 1 for filling a container B with bulk material 2, in particular sand, with an electro-optical distance measuring device 14 for measuring the filling level V of the bulk material 2 in the container B during the filling process is represented. The device 1 has a storage container 3 for the bulk material 2 with a closable lid 4, preferably on the upper side. Arranged on the lower side of the storage container 3 is an outlet 5, via which the bulk material 2 passes into the dosing device 6 arranged there below. In the present construction of the filling apparatus 1, the storage container 3 is not designed as a pressure container, which is why it can be formed from light metal, for example aluminium or an aluminium alloy, or even plastic, and has a relatively low weight. The storage container 3 is preferably substantially cylindrical and tapered toward the outlet 5. A visual check of the filling level V' of the bulk material 2 in the storage container 3 can be carried out via a viewing glass 11 which may be in the storage container 3. Alternatively or additionally, sensors 13 for detecting the filling level V' of the bulk material 2 can also be arranged in the storage container 3. Sensors 13 of this type can be implemented in various ways, for example as capacitive or optical sensors. The filling level V' can be given as a percentage of the volume of the storage container 3, as the height of the filling of the storage container 3 with the bulk material 2, as the volume of the bulk material 2 present in the storage container 3 or also as the weight of the bulk material 2 present in the storage container 3.

Arranged preferably below the metering device 6 is a pneumatic conveying device 7 for conveying the bulk material 2, which can be designed, for example, in the form of an injector 9 with a plurality of bores 10, 10' for the compressed air P (see FIG. 3). A pressure relief valve 12 can preferably be arranged on the top side of the storage container 3, via which excess pressure can escape, when filling the storage container 3. The compressed air P is provided via a compressed air connection 23 or its own compressor 24 and is guided via a pressure regulator 19 to the various points, in particular the pneumatic conveying device 7 and, if necessary, pneumatically designed metering device 6. Via the pressure regulator 19, influence can be exerted in a very simple manner on the discharge quantity of the bulk material 2 via the outlet 5 in the storage container 3.

Connected to the outlet of the pneumatic conveying device 7 is the conveying hose 8, via which the bulk material 2 is transported in a substantially floating manner through the conveying hose 8. Arranged at the free end of the conveying hose 8 is a blow-out lance 25, which represents the connecting piece to the filler neck of the container B to be filled, for example in a vehicle, in particular a rail vehicle. The blow-out lance 2 is preferably designed as a thick-walled stainless-steel tube and is provided in a corresponding length depending on the respective vehicle type. A sensor 22 for measuring the flow of the bulk material 2 can be arranged in the pneumatic conveying device 7, which sensor can provide important information about any obstruction or an irregular conveying of the bulk material 2.

To control the filling process, a control device 20 is provided, which is connected to the most important components of the filling apparatus 1, to the sensor 22 for detecting the flow of the bulk material, or to an actuating element 31 preferably arranged at the end of the conveying hose 8 or of the blow-out lance 25. The control device 20 is supplied with electric power via a corresponding electric line 32. Alternatively or additionally, an energy store 36, in particular an accumulator, can be provided, which ensures the supply of electrical energy to the electrical components for the duration of the filling process.

According to the invention, an electro-optical distance measuring device 14 is provided with a light guide 15 for measuring the filling level V of the bulk material 2 in the container B during the filling process, wherein the free end 16 of the light guide 15 is arranged in the region of the blow-out lance 25. The electro-optical distance measuring device 14, which may be formed, for example, by a laser distance measuring device, is connected to the control device 20. The light guide 15 can be arranged in a protective tube 17 (see FIG. 2). If the electro-optical distance measuring device 14 detects a predetermined maximum filling level $V_{max}$ of the bulk material 2 in the container B, the control device 20 can deactivate the conveying of the bulk material 2, if necessary, with a secondary blowing function (see FIG. 4). In addition, a further measuring device 18 for detecting the filling level V of the bulk material 2 in the container B can be arranged on the container B, which can also provide information about the current filling level V in the container B outside the filling processes (see also FIG. 2).

Arranged on the blow-out lance 25 is preferably a suction-removal nozzle 26, which is preferably displaceable and fixable in the longitudinal direction of the blow-out lance 25, so that a corresponding adaptation to the respective structural conditions can take place. Any dust produced during the filling process is sucked off via the suction-removal nozzle 26 and collected along a suction hose 27 in a suction and dedusting device 28, preferably with a filter 29 and a dust collection container 30. As a result, contamination can be prevented or at least reduced and a hazard to the personnel by the dust can be avoided.

If all the components of the filling apparatus 1 are arranged on a suitable carrier platform and wheels 34 or the like are provided thereto, the filling apparatus 1 can be easily moved to the container 3 to be filled, resulting in shorter conveying paths, and consequently lowering energy costs. If at least one wheel 34 is connected to a corresponding drive 35, the movement of the filling apparatus 1 can be facilitated.

Figure 2:
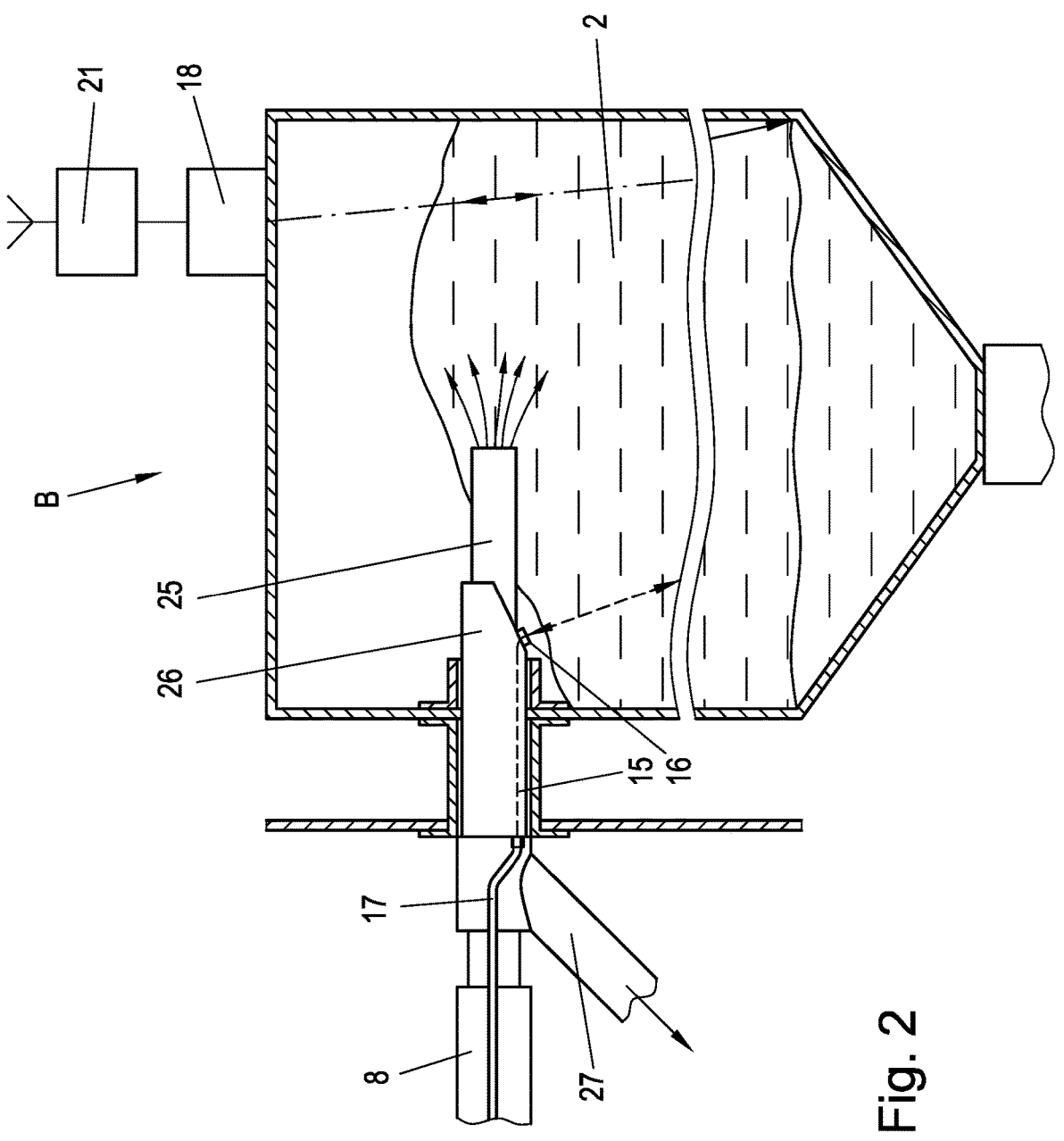
FIG. 2 shows a detailed view of the filling apparatus in the container to be filled for the bulk material.

FIG. 2 shows a detailed view of the filling apparatus 1 in the container B to be filled for the bulk material 2. The blow-out lance 25 at the free end of the conveying hose 8 is inserted into a filling opening in the container B during the filling process. A suction-removal nozzle 26 is arranged coaxially around the blow-out lance 25 and is connected via a suction hose 27 to a suction and dedusting device 28, preferably to a filter 29 and a dust collection container 30 (see FIG. 1). In the exemplary embodiment shown, the suction-removal nozzle 26 is arranged in the form of a jacket around the blow-out lance 25, so that an annular gap is formed between them, via which the dust formed during the filling process is suctioned off. The light guide 15 of the electro-optical distance measuring device 14 is preferably arranged on the suction-removal nozzle 26 and suitably oriented so that the filling level V of the bulk material 2 in the container B can be detected during the filling process. The suction of the dust ensures that the free end of the light guide 15 remains clean and allows a reliable distance measurement for determining the filling level V. The light guide 15 is guided in a protective tube 17 to the electro-optical distance measuring device 14, for example along or in a casing (not shown) of the conveying tube 8. If a certain predetermined maximum filling level $V_{max}$, which is, for example, 80% of the volume in the container, is reached, a corresponding message is sent to the control device 20, which stops the conveyance of the bulk material 2 or stops it after a set period of time $\Delta t$.

In addition, a further measuring device 18 for detecting the filling level V of the bulk material 2 in the container B can be arranged on the container B, which can also provide information about the current filling level V in the container B and forward it by means of a transmitter 21 to superordinate exchange centre stations 38.

Figure 3:
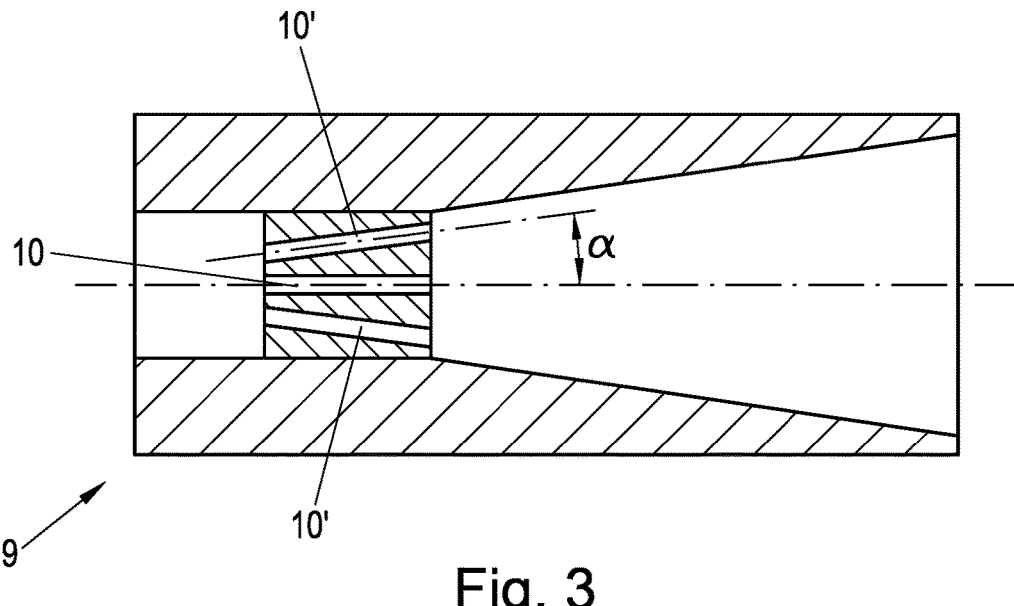
FIG. 3 shows a detail of a device designed as an injector for pneumatically conveying the bulk material.

FIG. 3 shows an enlarged view of a detail of a pneumatic conveying device 7 designed as an injector 9. The injector 9 has a plurality of, preferably at least 5, bores 10, 10', wherein a bore 10 extends centrally and the other bores 10' are arranged in a circle around the central bore 10, preferably at equal angular distances from one another. The outer bores 10' arranged around the central bore 10 can be arranged to extend conically outwards, for example at an angle α of between 2.5 and 7.5 degrees. This construction of a so-called propelling jet injector ensures an optimum conveying of the bulk material 2 in the conveying hose 8 with an optimum flow profile of the compressed air P in the outlet of the injector 9 and thereby enables a quasi-suspended conveying of the bulk material 2 within the conveying hose 8 to the container B to be filled.

Figure 4:
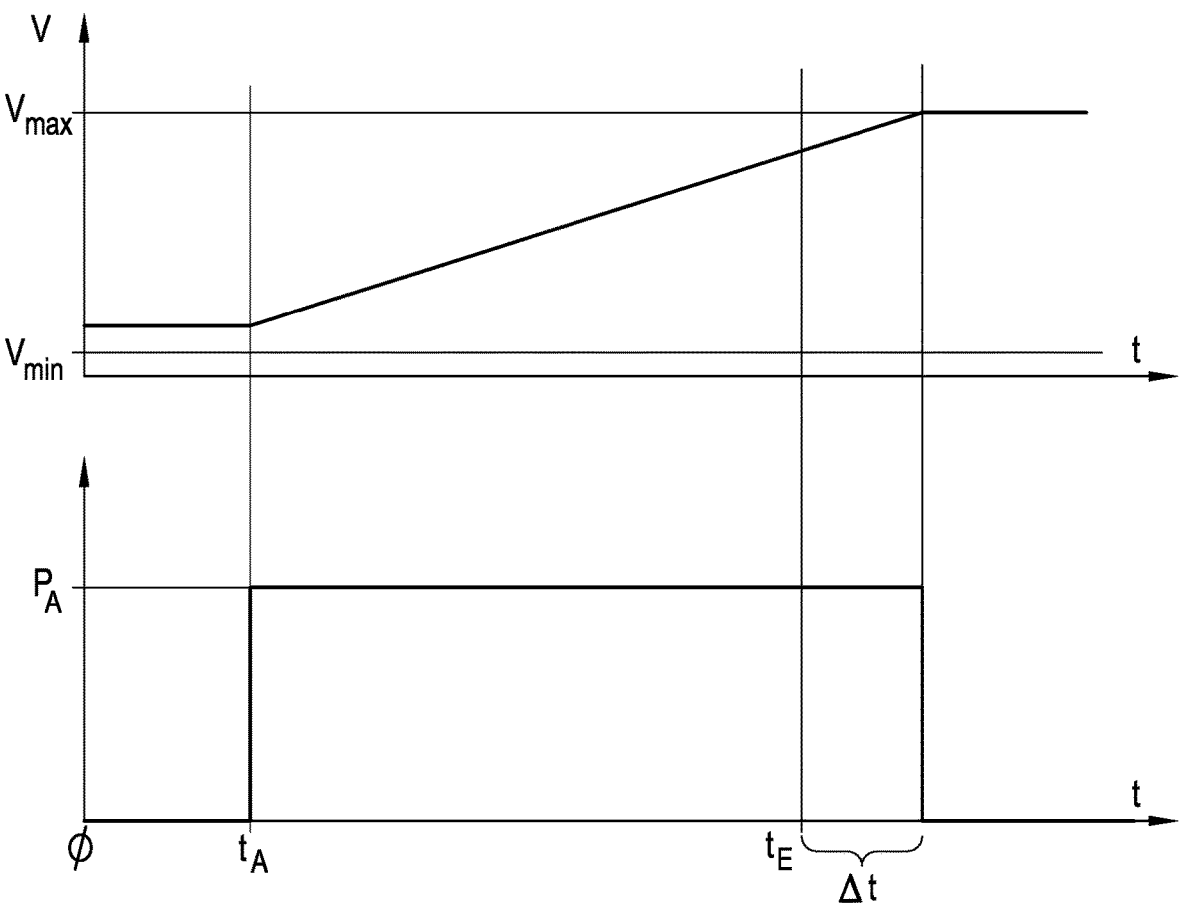
FIG. 4 shows the time profiles of the filling level in the container to be filled and of the compressed air for operating a conveying device of the filling apparatus during the filling with bulk material.

Finally, FIG. 4 shows the time profiles of the filling level V of the bulk material 2 in the container B to be filled and of the compressed air P for operating the pneumatic conveying device 7 of the filling apparatus 1 during the filling process. At time $t_A$, the pneumatic conveying device 7 is activated by applying the compressed air P to the pneumatic conveying device 7 at an operating pressure $P_A$. The filling level V or the volume of bulk material 2 in the container B rises substantially linearly over time t from a certain residual filling level V located in the container B, which is above a minimum filling level $V_{min}$. If a predetermined maximum filling level $V_{max}$ of bulk material 2 in the container B is now detected with the optoelectronic distance measuring device 14 according to the invention, the conveyance of the bulk material 2 is terminated at time $t_E$ and the compressed air P is switched off. According to a preferred exemplary embodiment, however, the pneumatic conveying device 7 is continued to be operated over a presettable period of time Δt, that is to say, compressed air P is blown further into the pneumatic conveying device 7, as a result of which the conveying device 7 and the conveying hose 8 can be blown free of bulk material 2. Depending on the length of the conveying hose 8, the duration Δt of the blowing function can be, for example, between 3 and 10 seconds. Instead of a preset duration Δt, the end of the flow of bulk material 2 through the conveying hose 8 can also be detected with the aid of suitably arranged sensors, and the compressed air P can then be switched off. At the time $t_E$+Δt, the compressed air P is deactivated and thus the conveyance of the bulk material 2 is cut off.

Through the interaction of the electro-optical distance measuring device 14 with the control device 20, a reliable automatic shutdown of the filling apparatus 1 can be ensured and a rapid, dust-free filling of the container B with bulk material 2 can be achieved. By means of an additional measuring device 18 for detecting the filling level V of the bulk material 2 in the container B, a sensor for detecting the filling level V' of the bulk material 2 in the storage container 3 and its connection, for example via an exchange centre station 38, it can moreover be ensured that the storage container 3 is filled with bulk material 2 in good time and each container B is always filled with a sufficient amount of bulk material 2, which is absolutely necessary, for example, for a journey of a rail vehicle along a planned route.

The invention claimed is:

1. An apparatus for filling a first container with sand, the first container being for use in sanding systems that support braking and drive technology of rail vehicles, the apparatus comprising:
   a storage container for the sand having a closable lid and an outlet;
   a metering device arranged below the storage container;
   a pneumatic conveying device for conveying the sand with compressed air into the first container via a conveying hose having a blow-out lance at a free end of the conveying hose;
   a control device configured to control a filling process of the first container;
   a suction-removal nozzle arranged on the blow-out lance, the suction-removal nozzle being connected via a suction hose to a suction and dedusting device having a filter and a dust collecting container; and
   an electro-optical distance measuring device connected to the control device and arranged with a light guide for measuring a filling level of the sand in the first container during the filling process, the control device being connected to a second measuring device configured to detect the filling level of the sand in the first container and to a sensor in the storage container for detecting a filling level of the sand in the storage container, the second measuring device and the sensor being connected to a superordinate control exchange center, the suction-removal nozzle being coaxially arranged around the blow-out lance, a free end of the light guide of the electro-optical distance measuring device being arranged at a region of the blow-out lance on the suction-removal nozzle.

2. The apparatus of claim 1, wherein the light guide is arranged in a protective tube.

3. The apparatus of claim 1, wherein the electro-optical distance measuring device includes a laser distance measuring device.

4. The apparatus of claim 1, wherein the control device is configured to deactivate conveyance of the sand responsive to the electro-optical distance measuring device measuring a predetermined filling level of the sand in the first container.

5. The apparatus of claim 4, wherein the control device is configured to delay deactivation of the conveyance of the sand for a predetermined duration.

6. The apparatus of claim 1, wherein the control device is wirelessly connected to the second measuring device for detecting the filling level of the sand in the first container.

7. The apparatus of claim 1, wherein the control device is configured to direct a display to depict the filling level of the sand in the first container.

8. The apparatus of claim 1, further comprising:
   a sensor connected to the control device, disposed in the conveying device, and configured to detect flow of the sand.

9. The apparatus of claim 1, further comprising:
   an actuating element arranged on the blow-out lance and connected to the control device.

10. The apparatus of claim 1, wherein the conveying device comprises an injector having a plurality of bores for the compressed air, wherein a central bore of the plurality of bores is centrally arranged in the injector with other bores of the plurality of bores arranged in a circle around the central bore at equal angular distances from one another.

* * * * *